Patented Aug. 22, 1939

2,170,670

UNITED STATES PATENT OFFICE 2,170,670

SALTS OF 2-MERCAPTO-BENZOTHIAZOLE

Ira Williams, Woodstown, N. J., assignor to E. I. du Pont de Nemours & Company, Wilmington, Del., a corporation of Delaware No Drawing. Application October 16, 1936, Serial No. 105,916

11 Claims. (Cl. 18—53)

This invention relates to the production of heavy metal salts of 2-mercapto-benzothiazole and more particularly to means of precipitating the product in a finely divided condition which will disperse readily in rubber.

The method of producing heavy metal salts of 2-mercapto-benzothiazole by the reaction in water solution of the sodium salt of mercaptobenzothiazole and a soluble heavy metal salt such as the chloride, sulfate or acetate is old in the art. The use of the zinc and lead salts of 2-mercaptobenzothiazole as accelerators of vulcanization is also old in the art. However, the salts have never been employed commercially, partly due to the difficulty of obtaining a sufficiently good dispersion in rubber.

An object of the present invention is to provide a method of preparing salts of 2-mercapto-benzothiazole in a finely divided form which will disperse readily when milled into rubber. Another object is to provide water insoluble salts of 2-mercapto-benzothiazole in a finely divided form which will readily disperse into rubber. Further objects are to provide new compositions of matter and to advance the art.

These objects may be accomplished in accordance with my invention which comprises treating a finely divided water insoluble salt of 2-mercapto-benzothiazole in water suspension with a liquid oil or with a liquid oily or waxy material under such conditions that the oily or waxy material is absorbed on the surface of the particles of the salt, separating the solids from the dispersion and drying said solids. The resulting products are soft fluffy lumps which readily disintegrate when touched and which mill into rubber in a well dispersed form without further treatment.

Preferably, the salts are precipitated in the presence of the oily or waxy materials, whereupon the oily or waxy materials are retained by the salts with great tenacity and quantities of more than 10% of the oily or fatty material will be retained by the salt during filtration thereof.

It is not necessary that the salts be prepared and precipitated in the presence of the oily materials as the dry salt may be finely ground and then dispersed in water and treated with the oily or waxy material. However, this alternative method is less desirable and the resulting product is less satisfactory.

Preferably, the oily or waxy material is a mineral hydrocarbon which may vary in consistency from oils having a viscosity of about 55 seconds Saybolt at 100° F. to high melting waxes and paraffins.

In order to more clearly illustrate my invention, the preferred modes of carrying the same into effect and the advantageous results to be obtained thereby, the following examples are given:

Example 1

41.8 parts of 2-mercapto-benzothiazole were treated with 10 parts of sodium hydroxide in 150 parts of water and the alkalinity adjusted by the further addition of sodium hydroxide until the solution was just neutral to Clayton yellow paper. The solution was then diluted with 150 parts of water and heated to 70° C. Five parts of low viscosity mineral oil known as medium process oil was then added while the solution was well stirred. A solution of 17.2 parts of zinc chloride in 250 parts of water at 70° C. was then added slowly with stirring. The gelatinous precipitate which was instantly formed rapidly crystallized until a very pale yellow, thin slurry resulted. This was filtered and washed at 70° C. and no oil appeared in the filtrate. The resulting zinc salt, when dried at 110° C., dispersed uniformly in rubber.

Example 2

The process described in Example 1 was repeated except that 58° paraffin was substituted for the mineral oil. The resulting zinc salt, when dried at 110° C., dispersed uniformly in rubber.

Example 3

The process described in Example 1 was followed, except that 2.5 parts of paraffin was used in place of the mineral oil. The results were substantially the same as in Example 1.

Example 4

41.8 parts of 2-mercapto-benzothiazole were treated with 10 parts of sodium hydroxide in 150 parts of water and the alkalinity adjusted by the further addition of sodium hydroxide until the solution was neutral to Clayton yellow paper. The solution was then diluted with 150 parts of water and heated to 70° C. Five parts of low melting paraffin was added and the solution further treated by adding a solution of 23 parts of cadmium chloride in 250 parts of water at 70° C. The material was stirred until it was in the condition of a thin cream colored slurry. This was filtered and washed while hot and dried at 100° C. The resulting material was in the form of cream colored, fluffy lumps which dispersed readily in rubber.

Example 5

This was run as in Example 4 except that the cadmium chloride was replaced with 47.5 parts of lead acetate containing 3 mols of water of crystallization. The resulting product was in the form of soft brown lumps which milled readily into rubber.

Example 6

47 parts of the zinc salt of mercapto-benzothiazole which did not disperse satisfactorily were slurried in 150 parts of water and brushed through a 200 mesh screen. The screened slurry was treated with 5.22 parts of low melting paraffin with good stirring at 70° C. The slurry was then filtered and the resulting material was dried at 105° C. The resulting zinc salt of mercapto-benzothiazole dispersed readily in rubber.

It will be seen from the examples that the essential conditions are the use of a water insoluble oily or waxy material readily absorbed by the metal salts and a fine state of division of the salt when brought into contact with the oily or waxy material. While in the above examples I have disclosed the use of mineral oil and paraffin, other somewhat similar materials such as high molecular weight alcohols or aliphatic esters of high molecular weight such as lauryl alcohol and ethyl laurate are of value in some cases and may be employed.

While I have disclosed the preferred embodiments of my invention and the preferred modes of carrying the same into effect, it will be readily apparent to those skilled in the art that many variations and modifications may be made therein without departing from the spirit of my invention. Accordingly, the scope of my invention is to be limited solely by the appended claims construed as broadly as is permissible in view of the prior art.

I claim:

1. The method of preparing heavy metal salts of 2-mercapto-benzothiazole which will disperse readily in rubber which comprises coating the heavy metal salts in finely divided form while in aqueous suspension with neutral inert water-insoluble oily or waxy hydrocarbons, separating the solids from the suspension and drying said solids.

2. The method of preparing heavy metal salts of 2-mercapto-benzothiazole which will disperse readily in rubber which comprises reacting an alkali metal salt of the mercapto-benzothiazole with water-soluble salts of the heavy metals in aqueous dispersions of neutral inert water-insoluble oily or waxy hydrocarbons, separating the solids from the dispersion and drying said solids.

3. The method of preparing heavy metal salts of 2-mercapto-benzothiazole which will disperse readily in rubber which comprises coating the heavy metal salts in finely divided form while in aqueous suspension with water-insoluble oily or waxy mineral hydrocarbons, separating the solids from the suspension and drying said solids.

4. The method of preparing heavy metal salts of 2-mercapto-benzothiazole which will disperse readily in rubber which comprises reacting an alkali metal salt of the mercapto-benzothiazole with water-soluble salts of the heavy metals in aqueous dispersions of water-insoluble oily or waxy mineral hydrocarbons, separating the solids from the disperson and drying said solids.

5. Water-insoluble heavy metal salts of 2-mercapto-benzothiazole in finely divided form the particles of which are coated with neutral inert water-insoluble oily or waxy hydrocarbons, the coated salts being substantially dry materials tending to form soft lumps.

6. Water-insoluble heavy metal salts of 2-mercapto-benzothiazole in finely divided form the particles of which are coated with water-insoluble oily or waxy mineral hydrocarbons, the coated salts being substantially dry materials tending to form soft lumps.

7. Water-insoluble heavy metal salts of 2-mercapto-benzothiazole in finely divided form the particles of which are coated with paraffin, the coated salts being substantially dry materials tending to form soft lumps.

8. The zinc salt of 2-mercapto-benzothiazole in finely divided form the particles of which are coated with neutral inert water-insoluble oily or waxy hydrocarbons, the coated salt being a substantially dry material tending to form soft lumps.

9. The zinc salt of 2-mercapto-benzothiazole in finely divided form the particles of which are coated with paraffin, the coated salt being a substantially dry material tending to form soft lumps.

10. The cadmium salt of 2-mercapto-benzothiazole in finely divided form the particles of which are coated with paraffin, the coated salt being a substantially dry material tending to form soft lumps.

11. The lead salt of 2-mercapto-benzothiazole in finely divided form the particles of which are coated with paraffin, the coated salt being a substantially dry material tending to form soft lumps.

IRA WILLIAMS.